United States Patent [19]

Cernon

[11] Patent Number: 5,315,106
[45] Date of Patent: May 24, 1994

[54] APPARATUS FOR EVALUATING BEACON LIGHTS, IN PARTICULAR ON RUNWAYS AND TAXIWAYS FOR AIRPLANES HAVING A LIGHT DIFFUSING REFLECTION BOX

[75] Inventor: Robert Cernon, Athis-Mons, France
[73] Assignee: Aeroport De Paris, France
[21] Appl. No.: 21,772
[22] Filed: Feb. 24, 1993

[30] Foreign Application Priority Data
Feb. 25, 1992 [FR] France .................. 92 02182

[51] Int. Cl.⁵ .............................. H01J 40/14
[52] U.S. Cl. .................... 250/215; 250/239
[58] Field of Search ............ 250/215, 239, 238, 216, 250/561; 356/215, 236, 240, 418, 419; 340/947, 953, 908; 73/170.08, 170.07; 180/169, 167

[56] References Cited
U.S. PATENT DOCUMENTS
3,746,867 7/1973 Phela, Jr. et al. .............. 250/215
4,328,545 5/1982 Halsall et al. .................. 250/215

Primary Examiner—David C. Nelms
Assistant Examiner—Que T. Le
Attorney, Agent, or Firm—Michael, Best & Friedrich

[57] ABSTRACT

The present invention relates to apparatus for in-situ evaluation of the light flux of narrow and intense light beams, in particular those from the beacon lights of airport runways and taxiways. It comprises a closed box mounted in a pod placed on a moving chassis, the box has a translucent front face that diffuses the light flux from the beam to be measured omni-directionally inside the box, and another face having high diffusing reflection power that closes the box and provides both reflection and diffusion of the light in uniform manner towards a photoelectric sensor whose sensitive portion is disposed close to the front face, but facing said diffusing reflection face.

10 Claims, 3 Drawing Sheets

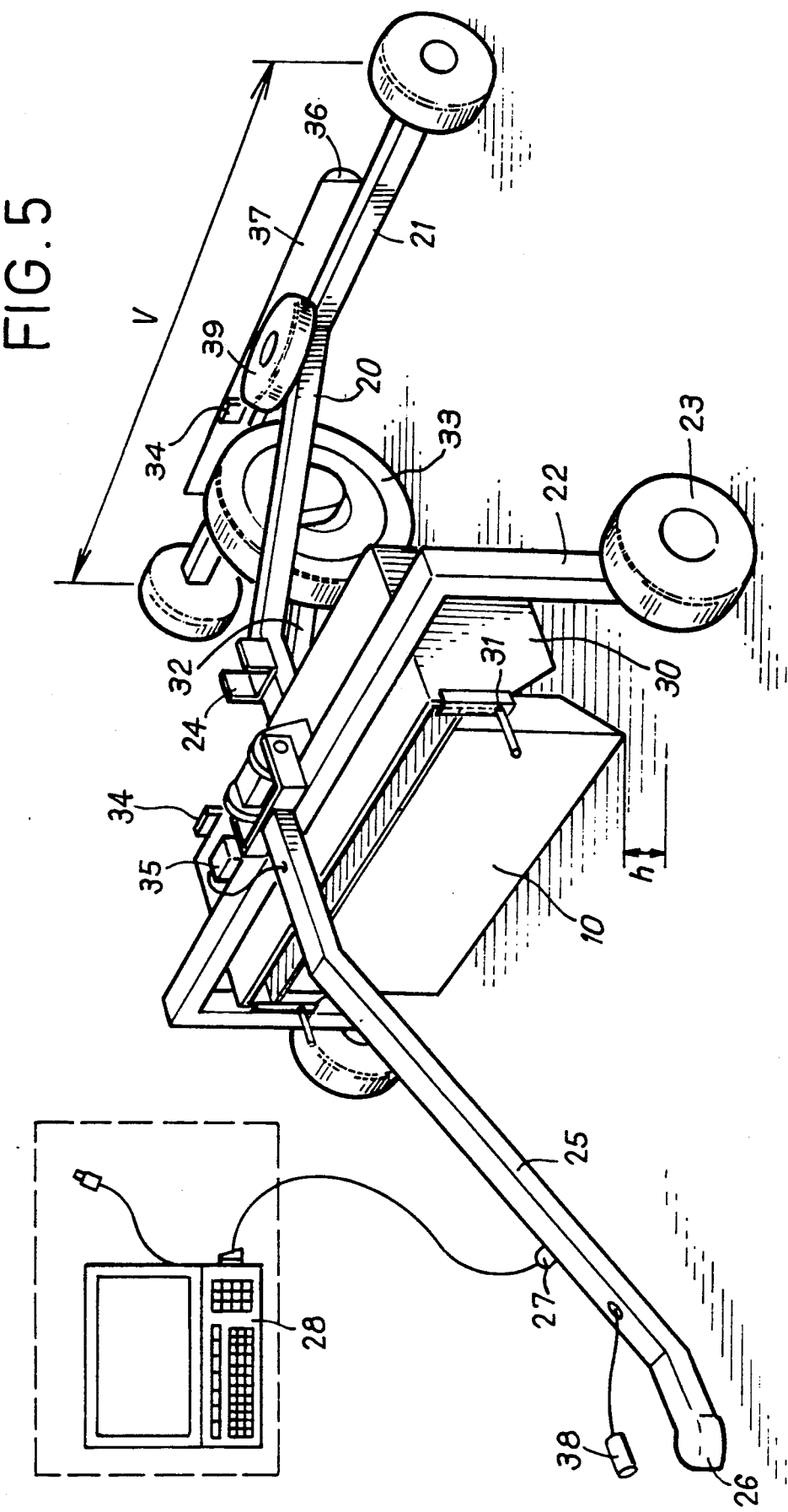

APPARATUS FOR EVALUATING BEACON LIGHTS, IN PARTICULAR ON RUNWAYS AND TAXIWAYS FOR AIRPLANES HAVING A LIGHT DIFFUSING REFLECTION BOX

The present invention relates to apparatus for photometric evaluation of beacon lights for runways and taxiways, in particular at airports. In operation, such evaluation does not require lights to be dismantled on-site. More generally, the apparatus of the invention is suitable for use whenever there is a need to perform photometric evaluation of narrow beam light sources.

BACKGROUND OF THE INVENTION

At present, beacon lights are mainly evaluated in photometric laboratories, i.e. off-site, using test benches that have several axes of freedom in order to scan the entire solid angle of a light and to make the corresponding light intensity measurements. Such tests are performed using the principles and rules appropriate to sampling. They require lights and their bases to be dismantled. In addition, evaluation requires 100 to 200 light intensity measurement points to be acquired so as to be able to plot isocandela curves and mean values in standard ellipses.

That approach gives rise to numerous drawbacks, and in particular: it is expensive; it takes no account of lamp power supply or environmental parameters; the handling involved runs the risk of changing the state of internal and external dirt; and since evaluation is based on sampling, it is not exhaustive as recommended by the standards that are in force (OACI Annex 14). Such assurance can be obtained only by 100% inspection.

Thus, patent document GB-A-1 454 272 describes apparatus enabling the light intensity of runway beacon lights to be determined on-site. It comprises a vehicle 13 having an alignment of six optical detectors 1 disposed thereon, with the axis of each detector being at a different angle to the horizontal (in the range 1° to 6°). An inductor loop 6 serves to detect when the apparatus passes over a light and to determine the distance at which a light intensity measurement is to be performed.

However, such a single measurement implies firstly that said distance is measured with sufficient accuracy, and secondly that the sensors are in a complex geometrical disposition so as to make it possible to perform measurement simultaneously with the required speed and accuracy.

Any offset relative to the measurement axis or any drift in distance measurement will be interpreted as a wrongly functioning light and may give rise to interpretation error or even to no evaluation.

In addition, when the measurements performed relate to an organized light array, they represent only a low level of sampling, i.e. they provide six particular values taken from a set that has an infinite number of values, with light flux analysis being limited to a single vertical slice of the solid angle of emission. The representation obtained is thus discontinuous. Furthermore, the single information obtained per light is unsuitable for computer processing, and there is no possibility of recovering information in the event of an error or in the absence of acquisition, thus making it impossible to analyze the causes of attenuation if any.

It may also be observed that the probability of digitizing the maximum point in the emitted beam is reduced since detection takes place in a single plane only.

OBJECTS AND SUMMARY OF THE INVENTION

The present invention seeks, in particular, to escape from the above constraints and to provide apparatus that is simple in structure while enabling continuous measurement to be performed of light intensity, and directly providing data that is proportional to the light flux produced by the beacon light.

These objects are achieved by an apparatus for in-situ evaluation of the light flux of intense and narrow light beams, in particular from runway beacon lights, the apparatus comprising a towed chassis, and an encoding wheel for determining the distance travelled between two lights, with passage past such lights being indicated by a detector, which apparatus further includes a pod designed to receive a closed box in which a photoelectric sensor or the like is disposed, said box having a translucent front face diffusing the light flux from the beam to be measured omnidirectionally inside the box, and at least one other face provided with high diffusing reflection power, closing said box and reflecting and diffusing the light in uniform manner towards the sensor whose sensitive portion is located in the vicinity of said front face, but faces towards the diffusing reflection face.

This apparatus makes it possible to pick up the light flux via an opalescent panel that limits the effects of the "cosine" law of partial reflection and that photometrically isolates the internal volume from the environment. Thereafter, said internal volume is used to reflect the trapped light randomly a large number of times so as to produce uniform flux on each portion of the inside surface such that the sum thereof is proportional to the flux produced by the beacon. Thus, the apparatus of the invention serves to integrate the received light flux.

Said other face includes five panels co-operating with said front face to form a parallelepiped, or else a semicylindrical case delimited by a cover and a base, that are both plane and semicircular.

The base may be provided with a light diffusing recuperator which diffuses a portion of the light flux emitted by the beam to be measured to the inside of the box, through an opening formed in said base.

Advantageously, the base may include at least one magnetic detector for detecting passage over a light that is emitting a beam to be measured.

Typically, the sensor is constituted by at least one photoelectric cell or photodiode or phototransistor or even a photoresistor, disposed off the main path of the light beam, and the front face is implemented in the form of a plane panel of methacrylate, of opal polyethylene, or else of polycarbonate.

Preferably, the box includes an auxiliary internal light source for monitoring the response of the sensor.

In addition, the pod may be raised by a linkage of levers and hinges so as to provide sufficient ground clearance while being moved over the measurement site.

BRIEF DESCRIPTION OF THE DRAWINGS

Other characteristics and advantages of the invention will appear more clearly on reading the following description given by way of non-limiting example and made with reference to the accompanying drawings, in which:

FIG. 5 shows the measurement apparatus integrated in an assembly of the invention for evaluating light beacons.

MORE DETAILED DESCRIPTION

Figure 1:
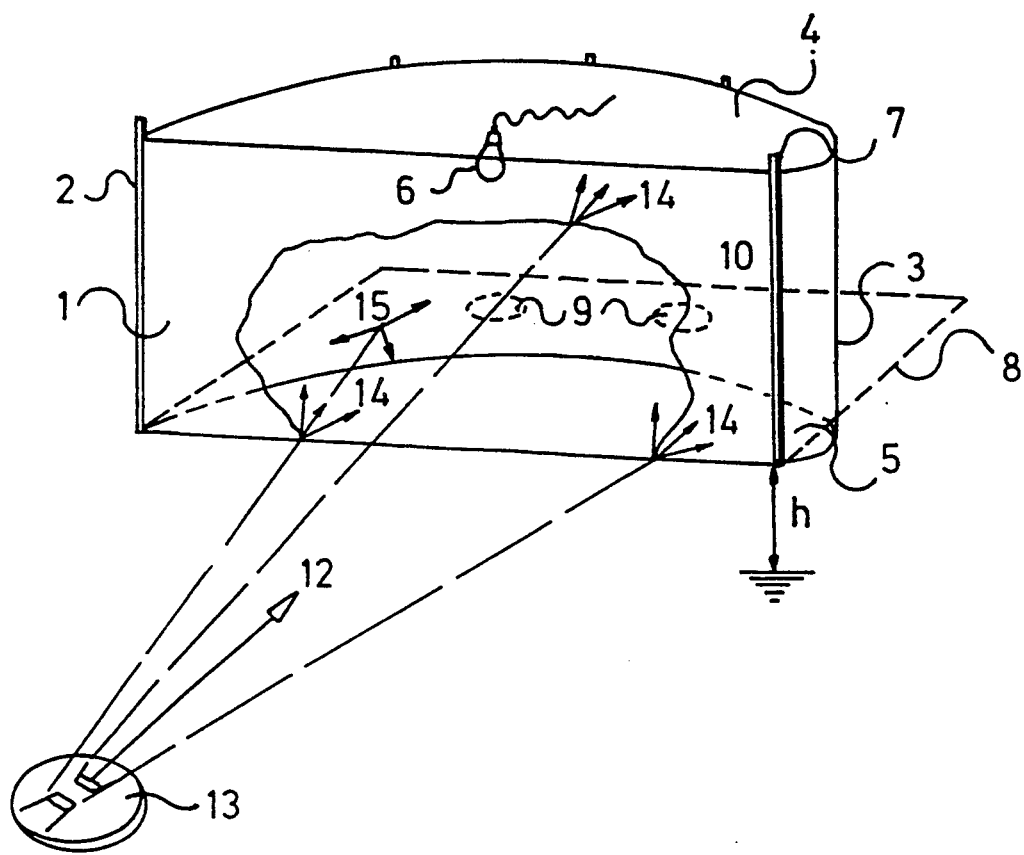
FIG. 1 is a perspective view of the measurement apparatus of the invention in the presence of a beacon light.

As shown in FIG. 1, the apparatus for measuring the light intensity from beacon lights is in the form of a closed box 10 in which a light flux sensor 6 is disposed. The function of the apparatus is to reflect the light trapped inside the box randomly a large number of times so that uniform flux is produced on the inside surface of the box, with the sum thereof being equal to the flux produced by a beacon light 13, thus integrating the received light flux under satisfactory conditions.

If the beam emitted by the lamp is used directly, satisfactory integration is not obtained since the original light gradients are too great for the uniformity to be acceptable. It is therefore necessary to begin by diffusing the beam when it enters the integrator. To this end, a white opalescent plane panel closes the front face of the box. The panel has the secondary function of providing photometric isolation between the measurement volume and the outside. If it were not there, the variable reflectance of the ground surrounding the beacon would give rise to varying photometric coupling between the two volumes.

The box comprises a case comprising thin metal walls: a semicylindrical wall 3 that is closed top and bottom by two semicircular thin panels 4 and 5. The box is closed by a front face 1 constituted by a plane panel typically made of methacrylate, of opal polyethylene, or else of polycarbonate, which provides random (omni-directional) diffusion 14 of the beam 12 from the beacon light 13.

The beams produced by such lights are intense and are contained within small solid angles defining the main path of the light beam. In non-limiting manner, common angles are of the order of ±5° in azimuth and of 0° to 7° in elevation.

The photometric response of the measurement apparatus is optimal at a determined distance from the source when the light is clean. Depending on how dirty the light has become, the maximum value of the detected light intensity varies while lying at a varying distance from the source. This particular feature of the sensor response is enhanced by the semicylindrical structure of the box and makes it possible to select causes for observed attenuation providing closely spaced linear measurements are available. These can be obtained using a light beacon evaluation assembly that is movable, being capable of running at up to 30 km/h to 35 km/h. The axial function of a 3,600 meter long runway can thus be analyzed in 10 minutes.

Similarly, as shown in FIG. 1, the base 5 may extend beyond the case 3 and receive at least one magnetic mass detector 9 for indicating when the apparatus is passing over a beacon light 13 whose emitted light intensity level is to be measured.

For this configuration in which the lights include magnetic elements, it is necessary to make the base 5 out of a non-magnetic material.

The sensor 6 forms a part of a system for acquiring and digitizing data that also includes a subassembly for on-site position finding (measuring distances, detecting the metal masses of the lights, counting the light sources) which is not described in detail since it presents no special difficulty of implementation for the person skilled in the art.

A light is a mechanical and optical structure in which each component is accurately determined. It comprises, in particular, a lamp, a prism, lenses, and a reflector. A filter and a shunt relay are also included in this assembly which is above the ground or encased in the runway, and which is to be evaluated on the run. It is subjected to several tens of measurements, of which only one or two are retained for evaluation purposes.

The main causes of light deficits from a beacon light are due to:
external dirt from deposits;
water inside the light;
a partial loss of electrical power;
wrong operation of the shunt relay;
a deformed filament in the lamp;
turns of the filament in contact with one another;
a degraded reflector;
a broken prism;
a mechanical defect: in the lamp, in the reflector, in the lens, or in the filter.

Structural reinforcements 2 (if present) are disposed outside the volume so as to avoid any discontinuity in the diffuse reflections. At least three of them are extended so as to provide anchor points 7 for anchoring the apparatus on a pod of a beacon evaluation assembly described more fully with reference to FIG. 5.

The inside of the volume is coated with industrial mat white paint applied in several layers so as to obtain a high reflection factor whose diffuse reflection characteristics are close to those of barium oxide (having a luminance factor of close to 1).

An opening formed in the top panel enables the sensor 6 which may be placed substantially in the center and at the top of the front face 1 to be secured with its sensitive face looking towards the curvature of the semicylinder.

An arrangement of this sensor on the other side of the front face (bottom, left or right side) is also possible an opening being formed on the corresponding panel. The sensor 6 which may be constituted by a photoelectric cell, a phototransistor, a photodiode, or even a photoresistor, may itself be fitted with an integrating diffuser having an attenuation of 1/10. A variant of the apparatus which avoids the drawback of a limited electrical response consists in using a cell fitted with a light integrator which does not attenuate its electrical response.

The view of FIG. 1 serves to show the projection of impacts of the main beam 12 on the screen, together with the diffusion effects 14 in the panel. The diffusing reflection of the surfaces treated with the special paint appears at 15.

In order to limit phenomena of thermal drift in the photo cell, the semicylindrical case may be fitted with a heater resistance associated with control means to maintain a stable temperature inside it.

It should be observed that although the semicylindrical configuration of the box of the invention provides best results with respect to making flux more uniform, it is not the only configuration possible, and it is quite possible to have a box 10 constituting a volume that is parallelepipedic, semi-spherical, or even semi-ellipsoidal. It is naturally necessary to ensure that the inside of the volume is treated as mentioned above and that its front face constitutes an opalescent material.

Figure 2:
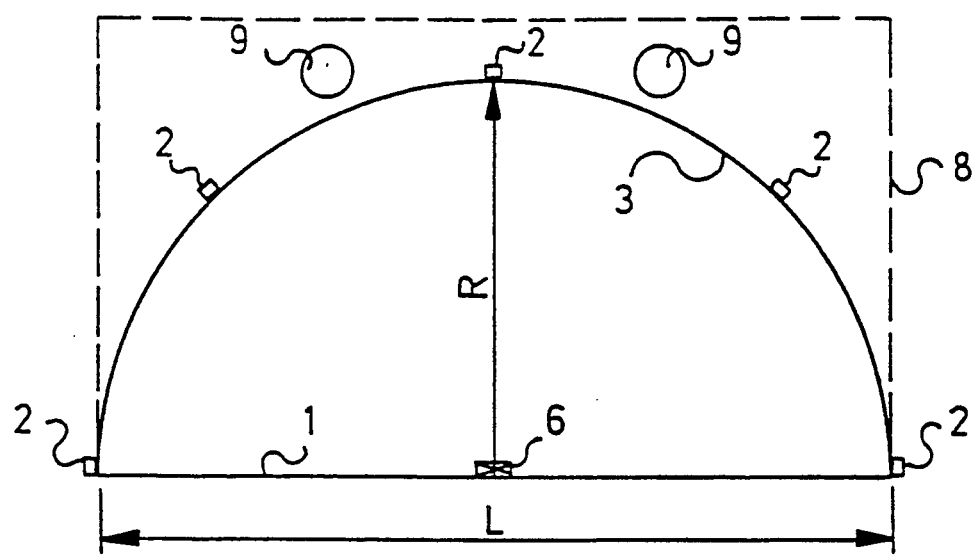
FIG. 2 is a plan view in section through the apparatus of FIG. 1.
Figure 3:
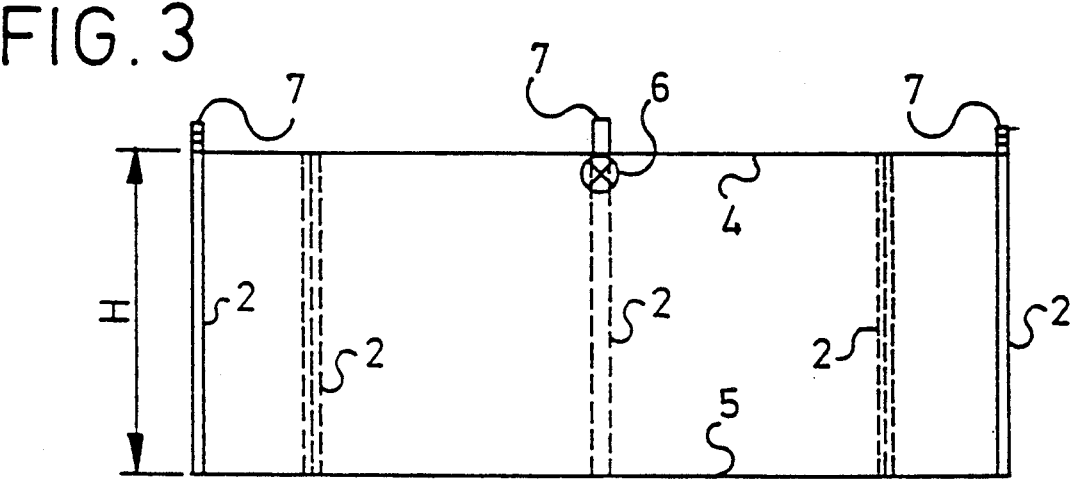
FIG. 3 is a front view of the FIG. 1 apparatus.

FIGS. 2 and 3 respectively represent a plan view in section and a front view of the measurement apparatus constituting a preferred embodiment of FIG. 1. The various anchor points 7 that enable the apparatus to be fixed in place can be seen more clearly, as can the special disposition of the sensor 6 against the front face 1 away from the main path of the light beam from the light, i.e. it is protected from picking up said beam directly in any way.

Figure 4:
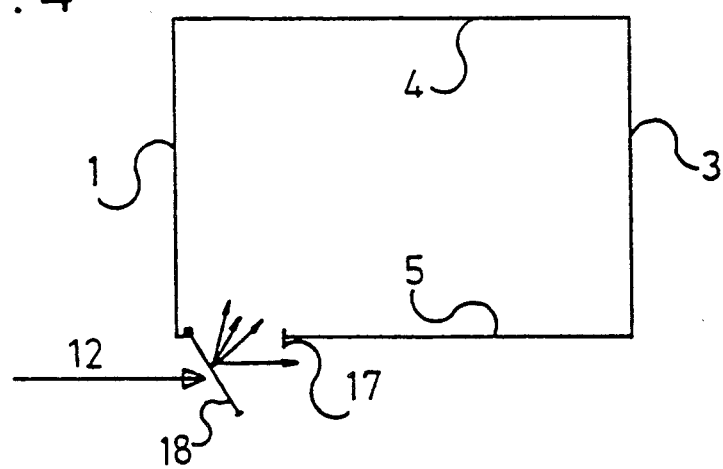
FIG. 4 shows the FIG. 1 apparatus provided with a light diffusing recuperator.

FIG. 4 shows a variant embodiment of the FIG. 1 apparatus having a diffusing flap 18 added thereto. Because the apparatus of the invention is mobile, it is necessary to maintain a minimum clearance distance between the base of the apparatus and the ground (see FIG. 1). As a result, a fraction of the beam is not picked up and passes under the apparatus. To recover this flux, the apparatus may be fitted with a diffusing flap 18. The portion of the beam that is initially not picked up is then picked up a rectangular opening 17 formed in the base wall 5 and occupying the entire width of the front face 1. The sensor then operates in two modes: a "normal" mode and a "contact" mode, with the "contact" mode taking place when the flap comes into contact with the light. In this second mode, the sensor gives a very high response and it is therefore necessary to process and select the useful information. In contrast, in "normal" mode, the advantage of the flap device is that it is much less sensitive to changes in the level of the sensor 6 relative to the light 13.

FIG. 5 shows an assembly in accordance with the invention for evaluating beacons and integrating the above-mentioned measurement apparatus.

A chassis 20 is provided with an axle 21 and supports a moving frame 22 that is capable of swivelling more than 130 about a vertical axis. A wide track V and low pressure wheels 23 provide stabilization and absorb vibration.

The moving frame 22 supports a tow bar 25 fitted with a standard coupling 26 for a towing vehicle, and a connector 27 for connecting to an acquisition and digitizing assembly 28 installed on the towing vehicle.

The measurement apparatus 10 is mounted on a pod 30 suspended by means of a two-position locking mechanism 31 having levers and hinges which enable the pod to raised so as to provide adequate ground clearance while travelling to the measurement site.

When in the measurement configuration, a hinged spring arm 32 ensures that an encoding wheel 33 has continuous contact with the ground so that the system can accurately evaluate the distance travelled between each of the lights 13. To do this, two switches 34 indicate the position of the encoding wheel 33 and of the measurement apparatus 10. An electronic interface housing 35 is fixed on the pod 30 for providing interfacing between the sensor 6 and a converter integrated in the acquisition and digitizing computer assembly 28.

All of the parts are covered in mat black paint in order to avoid parasitic reflections and all of the cables are laid in the tubes constituting the framework of the chassis and of the tow bar. In order to enable the measurement apparatus to be transported to other sites, in particular on the public road network, a spare wheel 39 is fixed on the chassis 20 which is also fitted with rear lights 36, a number plate 37, and a connector 38 for providing electrical connection with a towing vehicle.

The measurement apparatus makes it possible to scan an entire beacon system by moving continuously with the apparatus mounted on the evaluation assembly being displaced by a towing vehicle. The measurement sequence is initialized by an operator present on the towing vehicle whose heading can be maintained merely by means of rudimentary sights placed at the front of the vehicle where the driver can see them, thereby avoiding any significant deviation or weaving. Unlike the prior art apparatus mentioned at the beginning of the description, it is not absolutely essential to follow the axis of the lights exactly.

The results obtained by these measurements are then processed off-line by means of special software which determines the light intensity levels picked up over each beacon light of a determined runway or portion of runway, and provides output on the form of graphs.

An embodiment of the apparatus of the invention has shown the following effects (for apparatus having the following dimensions: L=100 cm, H=50 cm, R=50 cm, h=6 cm) with respect to:

angle of approach: the response of the apparatus is stable in the range $\pm 10°$, outside this limit an extra 0.5% of error must be accepted;

variation in the trim of the carrying vehicle: the maximum acceptable variation is 1.5 cm for an additional error of 1%;

offset of aiming axis: an offset of $\pm 10$ cm has been taken as being normal, with additional error being 1.4%; once the offset reaches $\pm 20$ cm, error reaches 5.6%;

ground reflection factor: the response of the sensor is not disturbed by the nature of the ground (clean runway or runway covered with tire marks);

ambient temperature: variation depends on the measurement system and on the cell used; and response time of the measurement system: the equipment must be selected to be compatible with the data acquisition time and with its frequency.

Thus, by virtue of its special structure, the beacon evaluation assembly produces a response that is optimum but that may vary from one light to another depending on how dirty the lights are. In the absence of such dirt, the measurement apparatus is adjusted to deliver a maximum response for each measured light-to-box distance. An out-of-range response then indicates that there is a high degree of dirtying or else that the light is suffering from an internal defect, and these various causes of inadequate light output can be analyzed by studying the shape of the response as a function of distance as provided by the measurement apparatus. Such dynamic analysis as proposed by the invention makes it possible to obtain simple correlation between the response level as observed when no dirt is present and the level that results from dirt only or from internal faults in a light.

It is of interest to observe that beacon lights other than the light being analyzed have hardly any influence on the response of the sensor, since the towing vehicle masks all of the lights situated upstream from the light being analyzed. However, it has been shown that in the absence of rain, mist, or fog (the only conditions for which measurements are valid, the error due to interfering flux from other lights is quite negligible and in any event can be treated as a constant which can be taken into account when evaluating the readings.

In order to reduce the size of the evaluation assembly in accordance with the invention while it is not in use, the moving frame 20 is provided with a bracket 24 for receiving the tow bar 25 that can be tilted about a horizontal axis, and thus swivels in elevation as well as in azimuth, so as to enable it to take up a folded position.

I claim:

1. Apparatus for in-situ elevation of the light flux of intense and narrow light beams, in particular from runway beacon lights, the apparatus comprising a towed chassis, and an encoding wheel for determining the distance travelled between two lights, which apparatus further includes a pod designated to receive a closed box in which a photoelectric sensor is disposed, said box having a translucent front face diffusing the light flux from a beam to be measured omnidirectionally inside the box, and at least one other face provided with high diffusing reflection power, wherein the light flux is reflected and diffused in uniform manner towards the sensor whose sensitive portion is located in the vicinity of said front face, but faces towards said diffusing reflection face.

2. Evaluation apparatus according to claim 1, wherein said other face includes five panels co-operating with said front face to form a parallelepiped.

3. An evaluation device according to claim 1, wherein said other face includes a semi-cylindrical wall delimited by a cover and a base, both of which are plane and semicircular.

4. Evaluation apparatus according to claim 1, wherein said closed box includes a light diffuser recuperator at its bottom portion for diffusing a fraction of the light flux emitted by the beam to be measured into the box through an opening formed through its bottom portion.

5. Evaluation apparatus according to claim 1, wherein said closed box includes at least one magnetic detector in its bottom portion for the purpose of detecting when the apparatus passes over a light emitting the beam to be measured, said bottom portion being made of a non-magnetic material.

6. Evaluation apparatus according to claim 1, wherein said sensor includes, disposed away from a main path of the light beam, at least one photoelectric cell, photodiode, photo-transistor, or photoresistor.

7. Evaluation apparatus according to claim 1, wherein said translucent front face includes a plane panel of methacrylate, of opal polyethylene, or of polycarbonate.

8. Evaluation approach according to claim 1, further including an auxiliary light source placed inside the box for the purpose of monitoring the response of the sensor.

9. Evaluation apparatus according to claim 1, wherein the towed chassis is provided with an axle and supports a moving frame that receives a tow bar that is hinged in elevation and in azimuth so as to be suitable for folding back on the chassis.

10. Evaluation apparatus according to claims 1, wherein the pod may be raised by a linkage of levers and hinges so as to provide adequate ground clearance while travelling to the measurement site.

* * * * *